US012565776B2

(12) United States Patent
Ruprecht

(10) Patent No.: US 12,565,776 B2
(45) Date of Patent: Mar. 3, 2026

(54) LEVER SPIGOT FOR GLASS RAILING SYSTEM

(71) Applicant: Clear View Glass Railings, LLC, Lakeland, MN (US)

(72) Inventor: John Ruprecht, Lakeland, MN (US)

(73) Assignee: Clear View Glass Railings, LLC, Lakeland, MN (US)

( * ) Notice: Subject to any disclaimer, the term of this patent is extended or adjusted under 35 U.S.C. 154(b) by 318 days.

(21) Appl. No.: 18/352,400

(22) Filed: Jul. 14, 2023

(65) Prior Publication Data

US 2023/0358054 A1 Nov. 9, 2023

Related U.S. Application Data

(63) Continuation-in-part of application No. 17/965,113, filed on Oct. 13, 2022.

(60) Provisional application No. 63/282,323, filed on Nov. 23, 2021.

(51) Int. Cl.
E04F 11/18 (2006.01)
F16B 2/18 (2006.01)

(52) U.S. Cl.
CPC ...... E04F 11/1853 (2013.01); E04F 11/1812 (2013.01); E04F 11/1814 (2013.01); F16B 2/185 (2013.01); E04F 2011/1831 (2013.01)

(58) Field of Classification Search
CPC ... F16B 2/185; E04F 11/1812; E04F 11/1814; E04F 11/1853; E04F 2011/1895
See application file for complete search history.

(56) References Cited

U.S. PATENT DOCUMENTS

| | | | | |
|---|---|---|---|---|
| 1,533,725 | A | 4/1925 | Davenport | |
| 4,870,793 | A * | 10/1989 | Tomlinson | E04F 11/1853 52/241 |
| 6,098,859 | A | 8/2000 | Bortner | |
| 6,517,056 | B2 | 2/2003 | Sheperd | |
| 7,083,421 | B1 | 8/2006 | Mori | |
| 7,559,536 | B1 * | 7/2009 | Hansen | E04F 11/1851 256/25 |
| 9,127,474 | B2 | 9/2015 | Tinwala | |
| 10,030,393 | B2 * | 7/2018 | Spence | E04F 11/1812 |
| 10,184,267 | B2 | 1/2019 | Kuo et al. | |

(Continued)

FOREIGN PATENT DOCUMENTS

| | | | | |
|---|---|---|---|---|
| DE | 10 2017 216 592 | * | 3/2019 | F16B 2/14 |
| EP | 3009580 A1 | | 4/2016 | |

*Primary Examiner* — Michael P Ferguson
(74) *Attorney, Agent, or Firm* — Mai D. Lauer; Westman, Champlin & Koehler, P.A.

(57) ABSTRACT

An apparatus includes an elongated body and a lever. The body has a base configured to mount on a surface. The body includes a slot configured to extend substantially perpendicular to the surface and a channel in communication with the slot. The lever is disposed in the channel and comprises a cam head pivotally connected to the body proximate a bottom of the channel and an end configured to move between an open position and a closed position, wherein the end is disposed proximate a top of the channel in the closed position. The cam head comprises a first surface that does not extend into the slot when the end is in the open position and a second surface that extends into the slot when the end is in the closed position. A system and method configured for mounting a panel to a surface are also described.

9 Claims, 8 Drawing Sheets

(56)  References Cited

U.S. PATENT DOCUMENTS

| 2014/0076947 | A1 |  | 3/2014 | McDonald |
| 2014/0367905 | A1 |  | 12/2014 | Wei |
| 2017/0037653 | A1 |  | 2/2017 | Schopf et al. |
| 2017/0292274 | A1 |  | 10/2017 | Downs |
| 2021/0087845 | A1 | * | 3/2021 | Bowling, III ....... E04H 12/2261 |

* cited by examiner

LEVER SPIGOT FOR GLASS RAILING SYSTEM

CROSS REFERENCE TO RELATED APPLICATIONS

This application is a continuation-in-part of U.S. patent application Ser. No. 17/965,113, filed Oct. 13, 2022; which claims the benefit of priority from U.S. Provisional Patent Application No. 63/282,323, filed Nov. 23, 2021. The contents of the priority applications are hereby incorporated by reference in their entireties.

BACKGROUND

A glass railing system offers numerous advantages over other barrier systems for decks and other elevated floor surfaces. Clear glass panels offer an unobstructed view beyond the railing. Moreover, an advantage of a glass railing system over similarly functional wood or metal railing systems is that a glass railing system offers a clean, contemporary look that is suitable for interior and exterior spaces. Moreover, panels made of glass, unlike hardwoods, do not need repeated painting, staining, or other finishing or maintenance to enhance their visual appeal and durability. Additionally, unlike hardwood railings, glass railings are not vulnerable to surface cracking. This disclosure describes illustrative embodiments of an apparatus, system and method to facilitate easy, quick and high quality installation of a glass railing system.

SUMMARY

In one aspect, an apparatus comprises an elongated body and a lever. The elongated body has a base configured to mount on a surface. The elongated body comprises a slot configured to extend substantially perpendicular to the surface and a channel in communication with the slot. The lever is disposed in the channel and comprises a cam head pivotally connected to the elongated body proximate a bottom of the channel and an end configured to move between an open position and a closed position. The end is disposed proximate a top of the channel in the closed position. The cam head comprises a first surface that does not extend into the slot when the end is in the open position and a second surface that extends into the slot when the end is in the closed position.

In another aspect, a system is configured for mounting a panel to a surface. The system comprises an elongated body, a lever and the panel. The elongated body has a base configured to mount on a surface. The elongated body comprises a slot configured to extend substantially perpendicular to the surface and a channel in communication with the slot. The lever is disposed in the channel and comprises a cam head pivotally connected to the elongated body proximate a bottom of the channel. The panel is disposed in the slot. A lever end is configured to move between an open position and a closed position, wherein the panel is frictionally engaged with the cam head when the lever end is in the closed position.

In yet another aspect, a method for mounting a panel to a surface comprises attaching a spigot by its base to the surface; disposing a portion of the panel in a slot of the spigot, wherein the panel extends substantially perpendicular to the surface; and raising an end of a lever of the spigot to frictionally engage the panel.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

Figure 1:
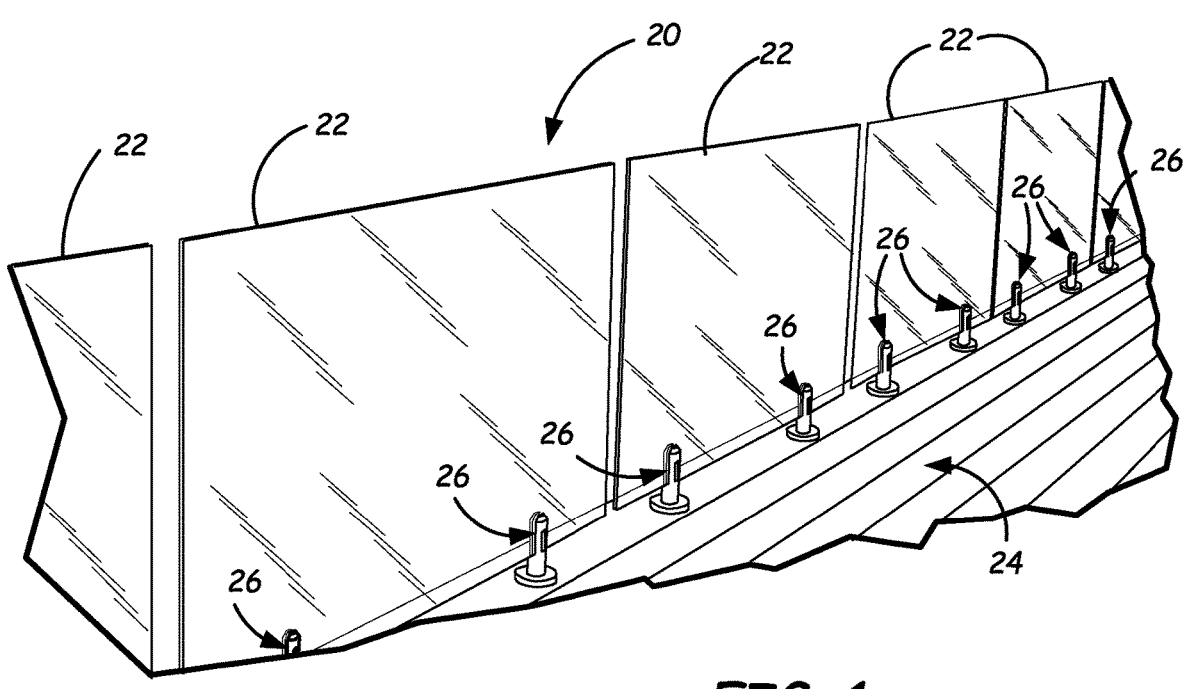
FIG. 1 is a partial perspective view of an exemplary glass railing system.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

For example, two embodiments of a lever spigot 26 are illustrated, with the first embodiment designated with reference number 26a and the second embodiment designated with reference number 26b. The reference number 26 is used to refer to a lever spigot that could have the configuration of either spigot 26a or 26b.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

FIG. 1 is a perspective view of a portion of a glass railing system 20. In an exemplary system 20, a plurality of glass panels 22 is attached to a surface 24 such as a deck, patio, or walkway, for example. Thus, an exemplary glass railing system 20 offers a physical barrier at an edge of a surface 24 without blocking a view through the barrier. The glass panels 22 are easily cleaned by wiping down with a squeegee or spraying with a hose. Moreover, many substances that might stain other surfaces can be easily wiped from glass without damaging the surface. For example, glass is able to easily withstand cleaning of substances such as marker ink, food and drink, and animal droppings without permanent damage. While glass panels in particular are discussed, panels of other materials can be used in system 20, such as to form privacy barriers, for example.

In an exemplary embodiment, each panel 22 is formed of two layers of six-millimeter thick tempered glass that is laminated together with a 1.5-millimeter layer of polyvinyl butyral (PVB) resin. In an exemplary embodiment, each panel 22 can resist a vertical load of about 2,520 pounds (1,143 kg) and a horizontal load of about 820 pounds (372 kg). In an exemplary embodiment, each panel 22 is about 5 feet (1.52 m) wide and about 39.4 inches (1.00 m) high, though other dimensions are also suitable. Other common panel widths include 12 inches (0.30 m), 18 inches (0.46 m), 24 inches (0.61 m), 30 inches (0.76 m), 36 inches (0.91 m), 42 inches (1.07 m), 48 inches (1.22 m) and 54 inches (1.37 m). When glass panel 22 is assembled onto spigots 26, an exemplary height of railing system 20 is about 42 inches (1.07 m).

In an exemplary embodiment of system 20, each of the panels 22 is attached to the surface 24 by one or more spigots 26. FIGS. 2-10 show views of a first exemplary spigot 26a. FIGS. 11-16 shows views of a second exemplary spigot 26b. In many respects, spigots 26a and 26b are similar, and descriptions of one also pertain to the other, unless otherwise stated. Moreover, a reference to spigot 26 pertains to both embodiments. In an exemplary embodiment, the primary components of spigot 26 are made of a material that is resistant to corrosion when exposed to outdoor elements such as rainwater or mist from nearby bodies of water, including potential saltwater exposure. An exemplary material is Duplex 2205, a ferritic-austenitic stainless steel, that is commercially available from James Duva Inc. of Branchburg, New Jersey.

Moreover, in an exemplary embodiment, each panel is supported by two spigots 26, though other numbers of spigots can also be used. Closer spacing of spigots 26 along a panel 22 allow the installed railing system 20 to withstand higher forces from users and wind. For example, positioning two spigots 26 on a panel, 36 inches (0.91 m) apart, allows the assembly to withstand wind gusts up to about 115 miles (185.1 km) per hour. In the same 36-inch (0.91 m) width, installing three spigots 26 to support the panel 22 will allow the installed assembly to withstand hurricane force winds. These strengths are obtainable when each spigot 26 is properly installed to a structural feature of the surface 24 such as a rim joist or laminated beam or concrete support using four lag bolts inserted through apertures 62, 62' meeting American Society for Testing and Materials (ASTM) A307 Grade A specifications with a ⅜ inch (9.53 mm) diameter and 3.5 inch (88.9 mm) length. Such bolts made of stainless steel or having a cadmium plating are preferable to resist corrosion and rust. When several spigots 26 are used to hold a single panel 22, their respective slots 34 are linearly aligned.

As shown in FIGS. 3-6, 9-13 and 15, in exemplary embodiments, spigot 26 has a base 28 for attachment to a surface 24 (with or without intervening leveling plate 78). FIGS. 2, 7-9, 13 and 15 show spigot 26a, 26b with a base cover 30 over base 28. In an exemplary embodiment, body 32 extends upwardly from base 28 and includes a panel receiving slot 34. In an exemplary embodiment, body 32 is shaped substantially as a cylinder with a tapered, generally frusto-conical top 36 to allow for the natural shedding of environmental materials such as leaves and other debris, preventing their accumulation on the body 32. While base 28 and body 32 are illustrated with substantially cylindrical exterior shapes having substantially circular cross sections, it is to be understood that other base and body shapes may be used without limitation, including, for example, square, non-square rectangular, oval, D-shaped, pentagonal, hexagonal, and octagonal. Moreover, the shapes of the base and body need not be the same. For example, a spigot having a rectangular base may have an oval-shaped body.

Figure 7:
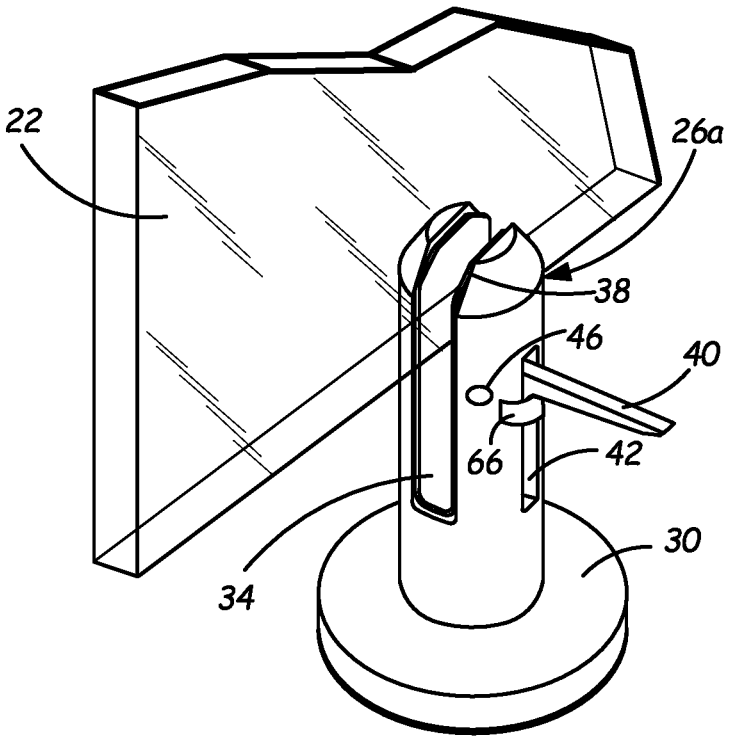
FIG. 7 is a perspective view showing insertion of a glass panel into the panel receiving slot with the lever in a raised configuration.

In an exemplary embodiment, a liner or boot 38 is removably disposed in the slot 34 to interface with the glass panel 22 to be inserted into the slot 34. In an exemplary embodiment, boot 38 is formed primarily of a deformable, resilient rubber or plastic material to allow a cam head of the spigot to firmly engage a glass panel 22 without damage thereto. During installation, a small amount of lubricant material such as petroleum jelly, for example, can be applied to an inside surface of the boot 38 before a glass panel 22 is inserted therein. FIG. 7 illustrates the insertion of a glass panel 22 into the boot 38 and slot 34. With lubricant therein, the panel can be moved within the boot to its desired final position. Without lubricant, the panel should be lifted in and out of the boot and slot only vertically with no horizontal motion. Moreover, any movement of the glass panel 22 within the boot 38 and slot 34 should only occur when the cam lever 40 is in the open position shown in FIGS. 5, 7 and 12.

In an exemplary embodiment, cam lever 40 is preferably configured to lie flat and flush against body 32 when in the closed position, as shown in FIGS. 1, 2, 8 and 15. In this configuration, cam lever 40 resides in channel 42 of body 32. In an exemplary embodiment, pin bore 44 extends through body 32 and connects to channel 42 to receive pin 46, which also passes through an aperture 52 in cam lever 40 (labeled in FIGS. 3, 4, 9, 11 and 13-16).

Figures 3, 4:
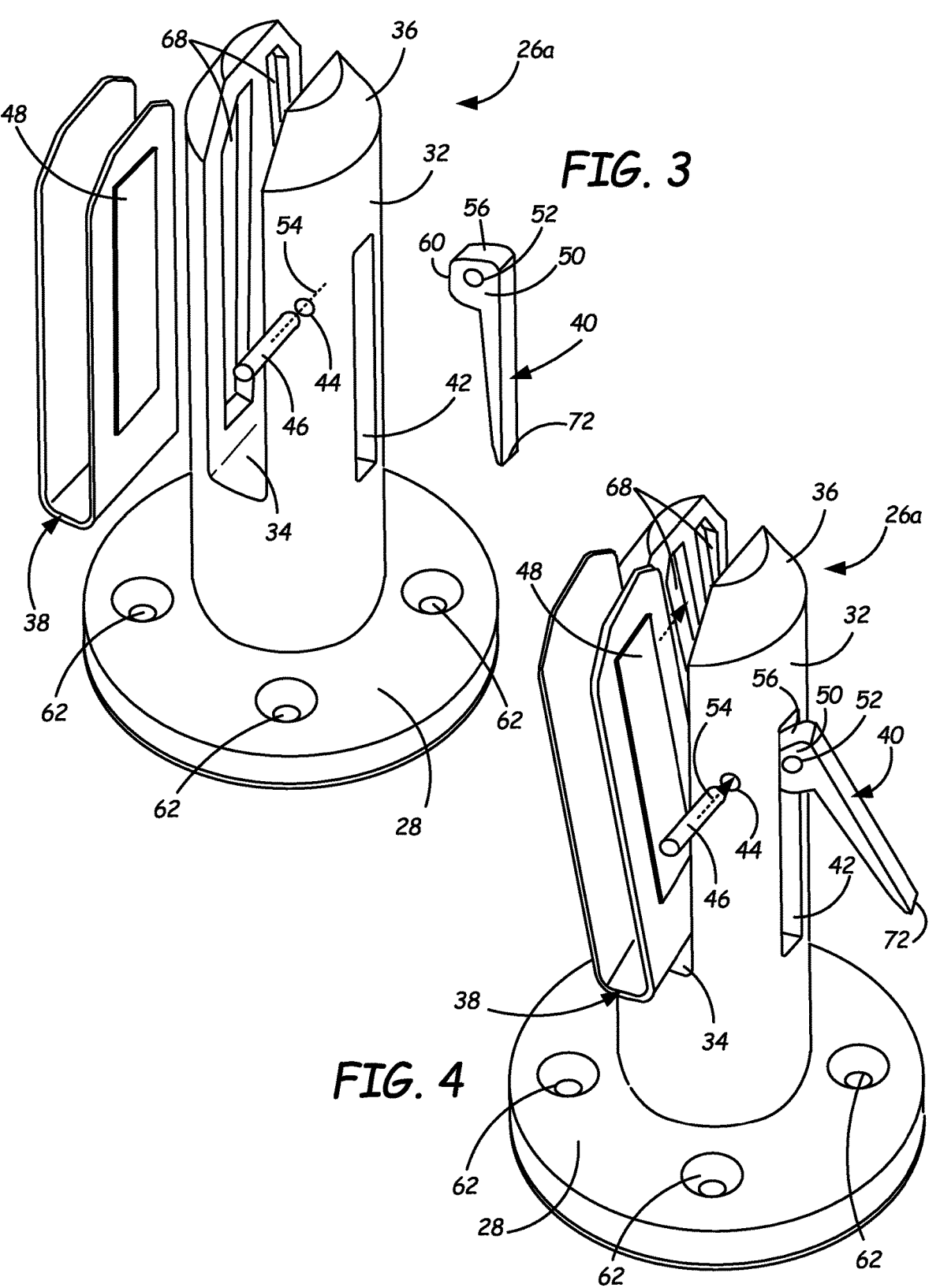
FIG. 3 is a partial perspective, exploded view of the spigot with some components removed therefrom.
FIG. 4 is a perspective view showing partial assembly of the spigot components of FIG. 3.
Figures 11, 12:
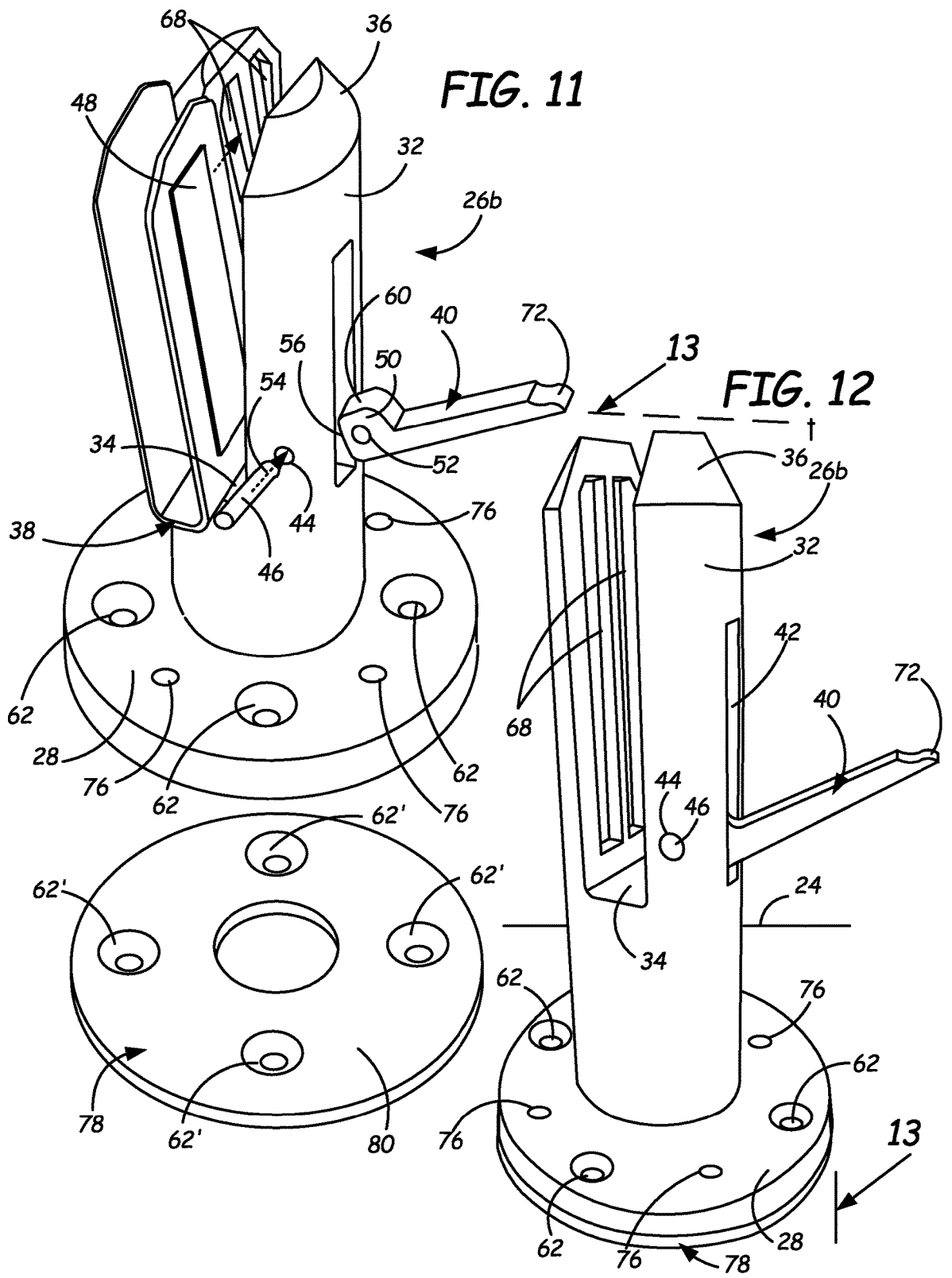
FIG. 11 is a perspective view showing partial assembly of a second exemplary spigot of the disclosure.
FIG. 12 is a perspective view of the second exemplary lever spigot with a boot removed and the lever in an open position to withdraw the cam head from the panel receiving slot.

FIGS. 3, 4 and 11 show partial, exploded views of spigot 26a, 26b with boot 38 partially or fully removed from slot 34. In an exemplary embodiment, boot 38 includes a stainless steel plate 48 configured to face cam lever 40 so that the cam head 50 of the cam lever 40 has a metal surface on which to press, thereby providing a durable, wear-resistant surface of the boot 38. In an exemplary embodiment, boot 38 is configured as a substantially U-shaped element, wherein the entire interior surface that contacts the glass panel 22 is formed of a resilient, compressible polymer or rubber or similar material that frictionally engages the smooth glass surfaces of panel 22 without damage or marks. In other embodiments, a resilient liner need not be configured to line three sides of slot 34 as illustrated; it could instead line one side or the other of slot 34, or a bottom surface of slot 34. Factors that could be taken into account to develop a configuration of a resilient liner such as boot 38 could include consideration of a material composition of panel 22 and its resistance to compression forces, for example.

FIG. 4 is a perspective view of the partially assembled components of spigot 26a shown in FIG. 3, including showing insertion of cam lever 40 into channel 42. FIG. 11 is a perspective view of the partially assembled components of spigot 26b, including showing insertion of cam lever 40 into channel 42. In an exemplary embodiment, cam lever 40 is an over-center cam that has a head 50 that is asymmetrical about aperture 52. When cam lever 40 is fully inserted, aperture 52 is aligned along pivot axis 54 with pin bore 44.

Figures 5, 6:
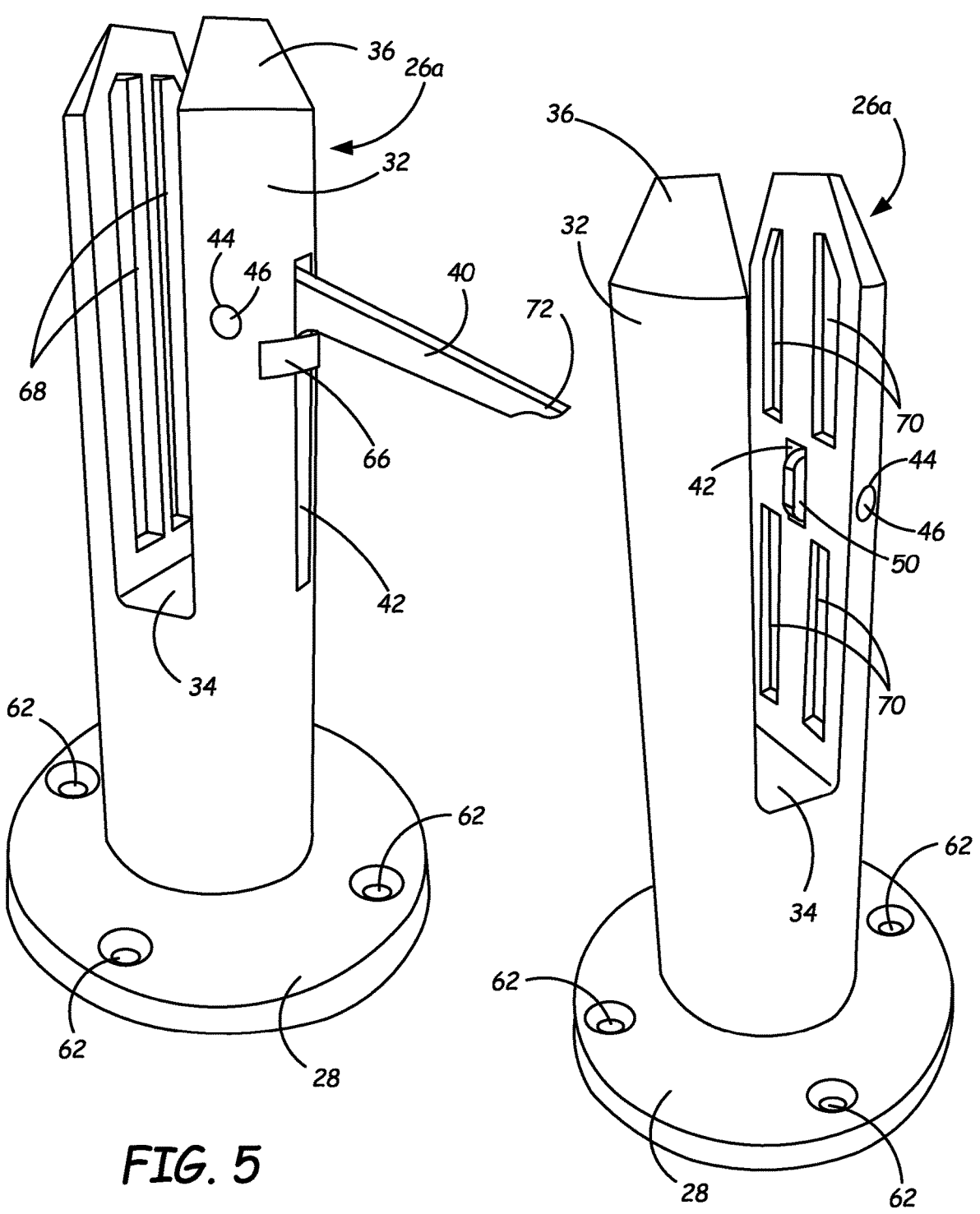
FIG. 5 is a perspective view showing the first exemplary spigot with a boot removed and the lever in an open position to withdraw the cam head from the panel receiving slot.
FIG. 6 is similar to FIG. 5 but is viewed from a different viewpoint; moreover, the lever is in a closed position.

FIG. 5 is a perspective view showing the exemplary spigot 26a with boot 38 removed and the lever 40 in an open position to withdraw the cam head 50 from the panel receiving slot 34. FIG. 6 is similar to FIG. 5 but is viewed from a different viewpoint; moreover, lever 40 is in a closed position, thereby positioning cam head 50 to partially protrude into slot 34. If a user does not wish to manually hold up the cam lever 40 while inserting glass panel 22 into slot 34, another tool could be used, such as a plastic piece inserted into channel 42, for example, to maintain the open position of cam lever 40. Even a tool such as a piece of adhesive tape 66 temporarily applied to an exterior surface of body 32 across channel 42 directly under raised cam lever 40 can be used to prevent gravity from causing cam lever 40 to fall downward.

FIG. 12 is a perspective view showing an exemplary spigot 26b with boot 38 removed and the lever 40 in an open position to withdraw the cam head 50 from the panel receiving slot 34. In this configuration, no extra tool or force beyond gravity is used to retain cam lever 40 in an open configuration.

As shown in FIGS. 5 and 12, in exemplary embodiments, body 32 includes internal longitudinal recesses 68 from which material is omitted for savings in weight and cost. Similarly, as shown in FIG. 6, body 32 includes internal recesses 70. Recesses 70 do not extend across the area of body 32 occupied by bore 44 and the pin 46 received therein, for connection to aperture 52 of the cam head 50 of lever 40.

Figure 2:
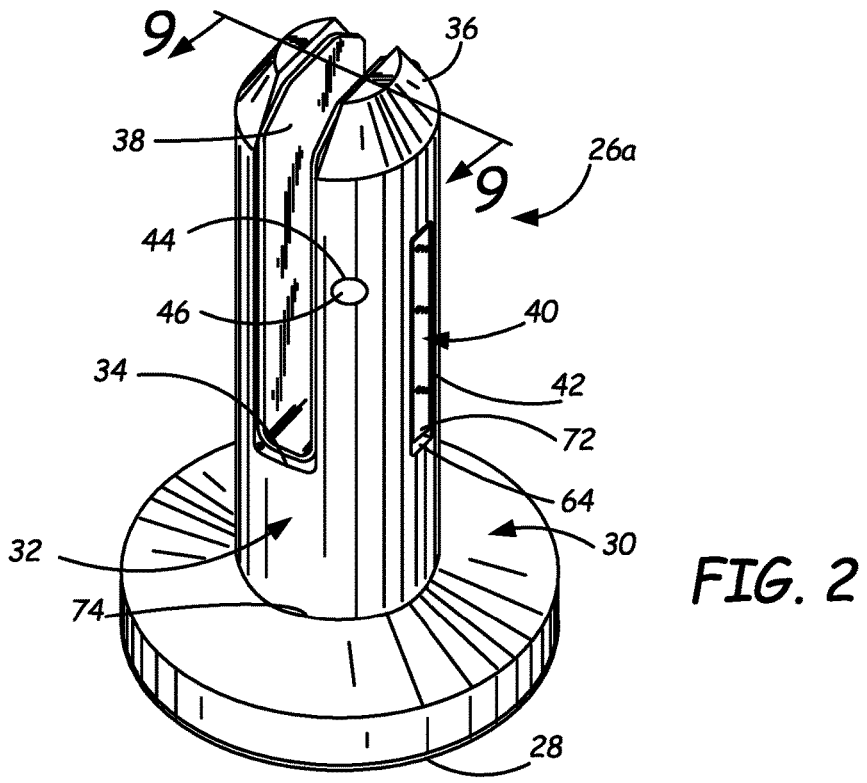
FIG. 2 is a perspective view of a first exemplary spigot of the system.

As shown in FIGS. 4, 5, 11 and 12, once the cam lever 40 is set into channel 42, the parts are assembled together by passage of pivot pin 46 into pin bore 44 and through aperture 52 in head 50 of cam lever 40. In a spigot 26a, 26b assembled for commercial sale, these parts will arrive at an end user in an already assembled configuration. As shown in FIG. 2, in an exemplary embodiment, a small gap 64 is disposed at an end of channel 42 past end 72 of cam lever 40, allowing a user to insert a fingertip or other object into the gap 64 to move the end 72 of cam lever 40 to its open position (shown in FIGS. 5, 7 and 12).

Figure 8:
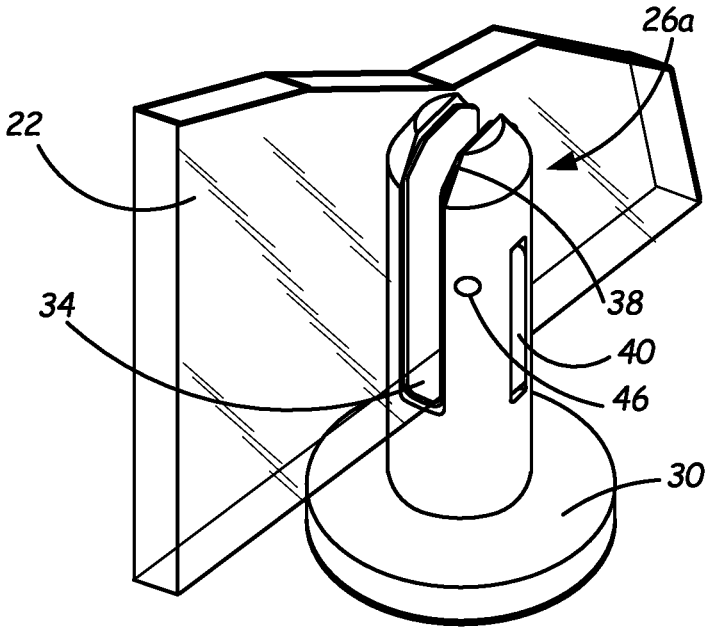
FIG. 8 is a perspective view showing the lever in a closed position to tighten the cam head against the glass panel positioned in the panel receiving slot.
Figure 14:
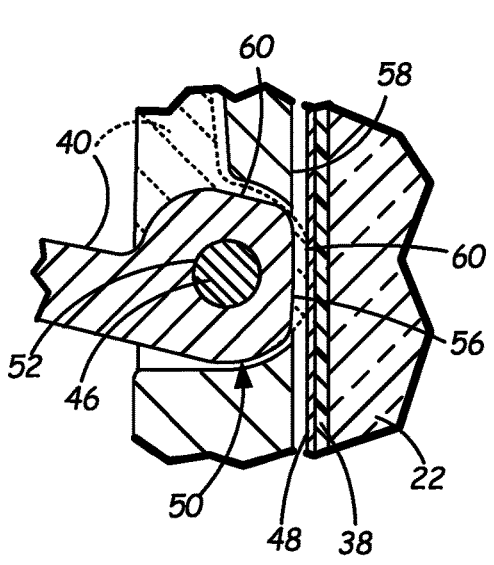
FIG. 14 is an enlarged view of the encircled portion of FIG. 13 labeled "14," additionally showing a partial glass panel inserted into the panel receiving slot.
Figure 15:
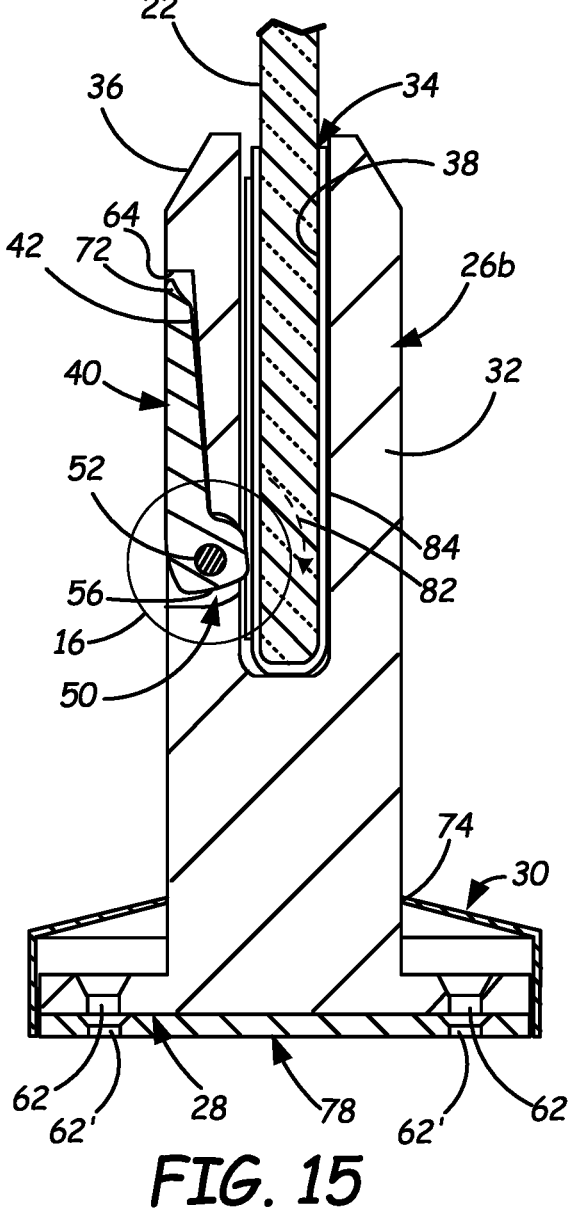
FIG. 15 is similar to FIG. 13 but shows the lever in a closed position so that the spigot and boot assembly frictionally engages a panel inserted into its slot.

In an exemplary embodiment, cam head 50 has surfaces 56, 60 at different distances from the pivot axis of pin 46. Surface 56 is closer to the pivot axis and is referred to as a relatively recessed surface of cam head 50. Surface 60 is farther from the pivot axis and is referred to as a relatively protruding surface of cam head 50. As shown in FIGS. 5, 7, 12 and in the solid line position of cam lever 40 in FIGS. 9, 10, 13 and 14 when cam lever 40 is open, its head 50 is rotated about aperture 52 to present a flat, relatively recessed surface 56 of the head 50 to slot 34. This is seen more clearly in FIGS. 10 and 14. In this orientation, surface 56 of head 50 that is at a smallest distance from aperture 52 is substantially flush with surface 58 of slot 34. Thus, a width of slot 34 for receipt of a glass panel 22 is unimpeded by the cam head 50 when the cam lever 40 is in the open position. As shown in FIG. 7, slot 34 is configured to receive the glass panel 22 and boot 38. Once glass panel 22 has been aligned in boot 38 and slot 34, cam lever 40 can be pivoted to its closed position such as illustrated in FIGS. 8 and 15. In the embodiment of spigot 26a, if tape 66 is used, it can be removed and discarded before cam lever 40 is pivoted to its closed position.

Figure 9:
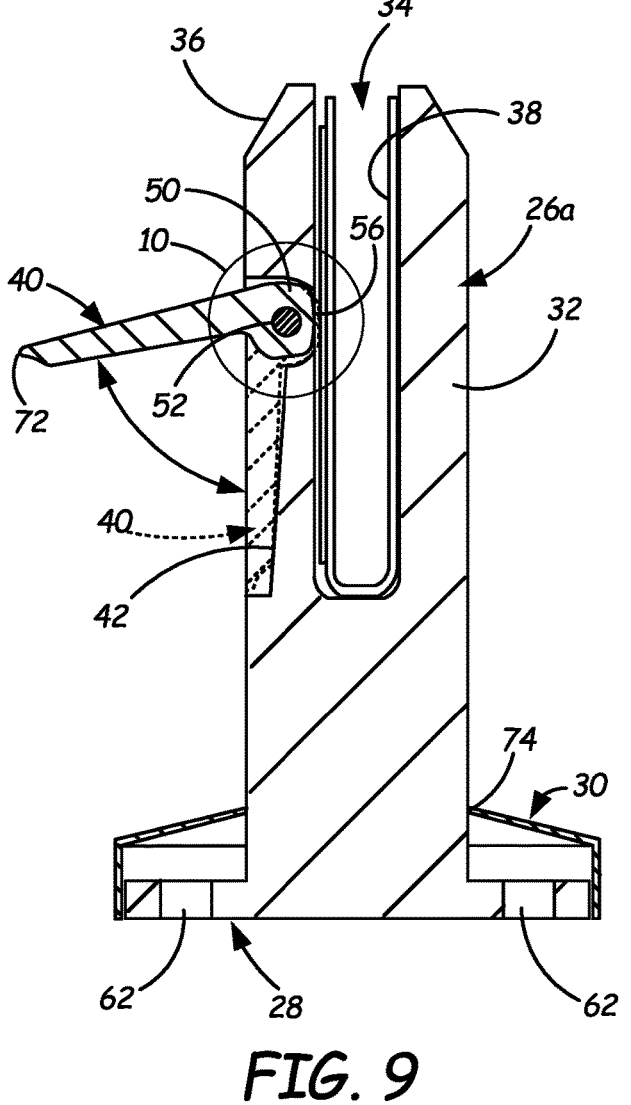
FIG. 9 is a cross sectional view taken along line 9-9 of FIG. 2, with the lever shown in an open position (in solid lines) and in a closed position (in phantom lines).
Figure 10:
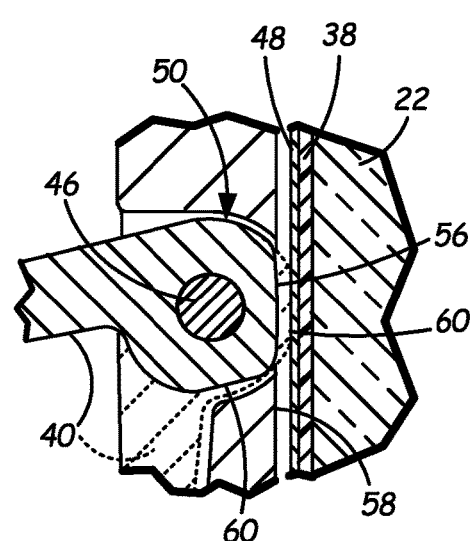
FIG. 10 is an enlarged view of the encircled portion of FIG. 9 labeled "10," additionally showing a partial glass panel inserted into the panel receiving slot.

As shown in FIGS. 8 and 15, once the glass panel 22 is completely lowered down into slot 34 and boot 38, the user can press cam lever 40 to pivot end 72 inward into channel 42 so that the lever 40 is in the position shown in FIGS. 2, 8, 15, 16 and in the phantom line position shown in FIGS. 9 and 10. In this closed position, the head 50 of the cam lever 40 is rotated about aperture 52 in order to present a protruding surface 60 of the head 50 into the slot 34. In this manner, the relatively protruding surface 60 of head 50 is positioned into the slot 34, projecting past the slot surface 58, and thereby bearing against plate 48 of boot 38. Thus, the relatively protruding surface 60 presses against the boot 38 and glass panel 22 inserted into boot 38, thereby frictionally securing glass panel 22 to spigot 26. In an exemplary embodiment, a difference in the distance of cam head protrusion in the two illustrated positions of FIGS. 9, 10, 13 and 14 is about 0.05 inch (1.27 mm). Of course, these exact dimensions can be varied to accommodate different sizes of boot 38, panel thicknesses of glass panel 22, and other component features.

In an exemplary embodiment of a glass railing system 20, the described configurations of an exemplary spigot 26 allows for a firm hold on glass panel 22 in the assembled configuration as shown in FIGS. 1, 8 and 15, while providing enough clearance to accommodate ease of panel installation and removal. Insertion of a glass panel 22 into the spigot 26 and the securing of the panel therein by pushing inward on cam lever 40 is quick and easy. It requires no tools and very little time. This is in contrast to other spigot designs, which typically require a user to manually adjust two or more set screws against a boot 38, wherein inattention or mistake can lead to overtightening, thereby risking breakage of the glass panel 22 or under tightening, risking an insecure attachment of the glass panel 22 in the spigot 26

FIGS. 3-6, 9, 11, 12, 13 and 15 show base 28 with apertures 62, configured for the acceptance of fasteners such as heavy-duty lag screws to fasten the spigot 26 firmly onto a surface 24. While apertures 62 are illustrated, other attachment elements can also be used, such as fasteners, for example. After the base 28 of spigot 26 has been fastened to surface 24, then the aperture 74 of base cover 30 can be slid over body 32 to present an aesthetically pleasing top surface of the base, as illustrated in FIGS. 1, 2, 7 and 8. Moreover, a downwardly sloping, smooth top surface of the base cover 30 prevents accumulation of liquid or solid debris in the apertures 62 or around the fasteners inserted therein.

After panel 22 is locked into spigot 26, the described installation steps can be reversed to easily disassemble the railing system 20. However, without purposeful and forceful opening of the cam lever 40, its design with the relatively flat contact area of surface 60 against plate 48 of boot 38 retains the locked panel assemblies of FIGS. 1, 8 and 15.

Figure 13:
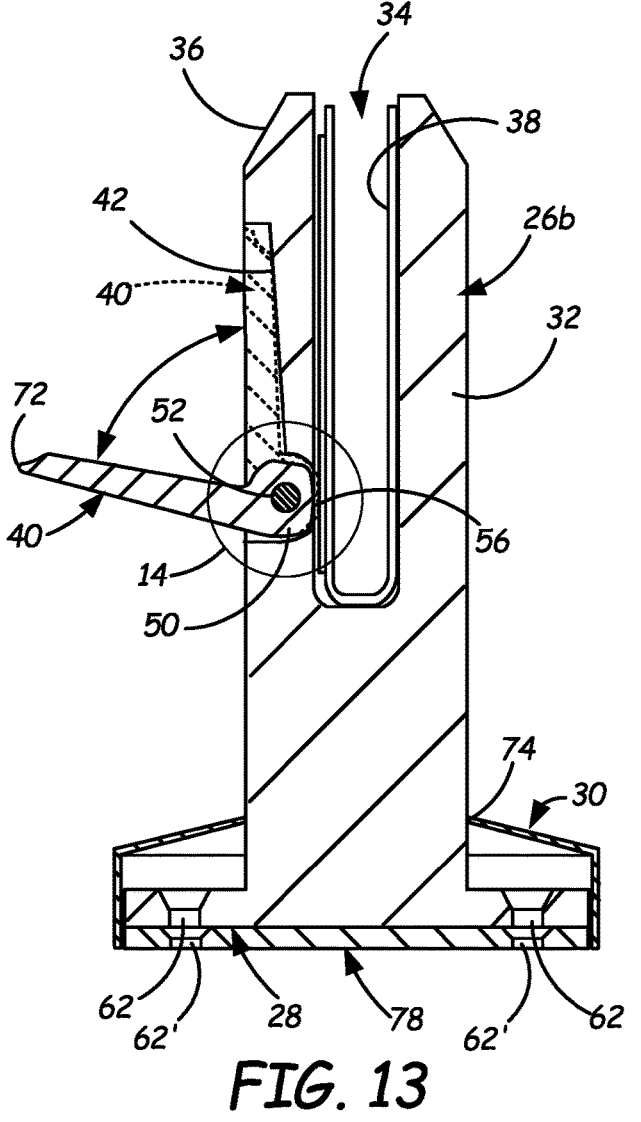
FIG. 13 is a cross sectional view taken along line 13-13 of FIG. 12, with the lever shown in an open position (in solid lines) and in a closed position (in phantom lines).

FIGS. 11 and 12 show perspective views of a second exemplary embodiment of a lever spigot 26b. In many respects, this embodiment is similar to that described above with reference to spigot 26a, and all descriptions are equally applicable unless otherwise stated. A primary difference in the second embodiment from the first is that the channel 42 receives head 50 of cam lever 40 near a bottom of the channel 42 rather than near a top of the channel 42. Thus, the pin 46 and bore 44 therefore are also placed lower within the channel 42. While the effect of the operation of cam lever 40 is similar to that described above, the direction of closing of the lever is upward rather than downward. As shown in FIG. 12, cam lever 40 is in an open position to withdraw the cam head 50 from the panel receiving slot 34. In this configuration of the lever spigot 26b, no tape is required because gravity will hold the lever 40 in this open position. Once a glass panel 22 is inserted into the slot 34 and boot 38, the cam lever 40 is pushed upward to achieve the configuration of FIGS. 15 and 16 (and the phantom lines of the cam lever 40 and its head 50 as shown in FIGS. 13 and 14), to engage the boot 38 against the glass panel 22. As the end 72 of the cam lever 40 is pushed upward about pin 46, the relatively protruding surface 60 of head 50 pivots about pin 46 to move against the liner bot 38 and panel 22, to urge the panel 22 downward to a bottom surface of the slot 34 and toward an opposed inner surface 84 of slot 34. The manipulation of lever 40 thus secures the panel 22 downwardly in slot 34.

As shown in FIGS. 12 and 13, in an exemplary embodiment, base 28 includes installation apertures 62 for attachment to surface 24 (see FIGS. 1 and 12) as well as a plurality of leveling apertures 76. In an exemplary embodiment, base backer plate 78 is placed between surface 24 and base 28, with surface installation apertures 62 of the base 28 aligned with the surface installation apertures 62' of the base backer plate 78. Set screws (not shown) can be inserted into the leveling apertures 76 and incrementally advanced against a top surface 80 of the base backer plate 78 to differential heights in order to tilt the base 28 and its attached body 32 relative to the base backer plate 78 on surface 24, in order to level the spigot 26 on an uneven or non-level surface 24. Where more than one spigot 26 is used to support a single panel 22, such tilt adjustment can be used to align the respective bottom surfaces of slots 34 of the spigots 26 with a bottom surface of the panel 22.

Figure 16:
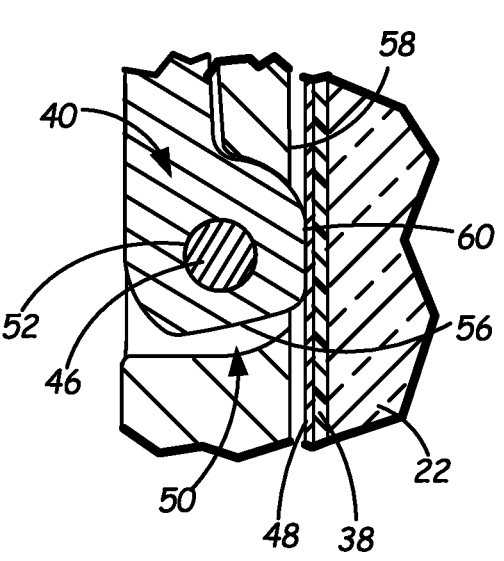
FIG. 16 is an enlarged view of the encircled portion of FIG. 15 labeled "16."

Exemplary, non-limiting embodiments of a disclosed apparatus, system and method of use are described. In an exemplary embodiment, an apparatus comprising spigot 26b comprises an elongated body 32 and a lever 40. The elongated body 32 has a base 28 that is configured to mount on a surface 24. The elongated body 32 comprises a slot 34 and a channel 42. The slot 34 is configured to extend substantially perpendicular to the surface 24. The channel 42 is in communication with the slot 34. The lever 40 is disposed in the channel 42 and comprises a cam head 50 and an end 72. The cam head 50 is pivotally connected to the elongated body 32 (such as at pin 46) proximate a bottom of the channel, as shown in FIG. 12. The end 72 is configured to move between an open position and a closed position, wherein the end 72 is disposed proximate a top of the channel 42 in the closed position, for spigot 26b, as shown in FIG. 15. The cam head 50 comprises a first surface 56 and a second surface 60. The first surface 56 does not extend into the slot 34 when the end 72 is in the open position (as shown in the solid line position of lever 40 in FIG. 14). The second surface 60 extends into the slot 34 when the end 72 is in the closed position (as shown in FIG. 16 and in the phantom line position of lever 40 in FIG. 14).

In an exemplary embodiment, an apparatus comprises a liner 38 disposed in the slot 34. In an exemplary embodiment, liner 38 comprises a resilient polymeric material. In an exemplary embodiment, liner 38 comprises a metallic plate 48 positioned to contact the cam head 50. In an exemplary embodiment, a cover 30 is disposed over the base 28, wherein the cover 30 has an aperture 74 through which the body 32 extends. In an exemplary embodiment, body 32 comprises an internal recess 68, 70 in communication with the slot 34.

In an exemplary embodiment, the base 28 comprises a plurality of first apertures 62 interspersed with a plurality of second apertures 76, and the apparatus comprises a leveling plate 78. In an exemplary embodiment, leveling plate 78 is configured to be disposed between the base 28 and the surface 24. In an exemplary embodiment, the leveling plate 78 comprises a plurality of third apertures 62' configured to vertically align with the plurality of first apertures 62.

In an exemplary embodiment, a system 20 is configured for mounting a panel 22 to a surface 24. In an exemplary embodiment, the system 20 comprises an elongated body 32, a lever 40, and the panel 22. In an exemplary embodiment, the elongated body 32 has a base 28 that is configured to mount on a surface 24. In an exemplary embodiment, the elongated body 32 comprises a slot 34 and a channel 42. The slot 34 is configured to extend substantially perpendicular to the surface 24. The channel 42 is in communication with the slot 34. The lever 40 is disposed in the channel 42 and has a cam head 50 pivotally connected to the elongated body 32 proximate a bottom of the channel (wherein the bottom is an end of the channel closer to the surface 24). The panel 22 is disposed in the slot 34. A lever end 72 is configured to move between an open position and a closed position; the panel is frictionally engaged with the cam head 50 when the end 72 is in the closed position.

In an exemplary embodiment of system 20, cam head 50 comprises a first surface 56 that does not extend into the slot 34 when the lever 40 is in the open position. Moreover, cam head 50 comprises a second surface 60 that extends into the slot 34 when the lever 40 is in the closed position. In an exemplary embodiment, a liner 38 is disposed in the slot 34 between the panel 22 and the body 32. In an exemplary embodiment, liner 38 comprises a resilient polymeric material. In an exemplary embodiment, liner 38 comprises a metallic plate 48 positioned to contact the cam head 50. In an exemplary embodiment, a cover 30 is disposed over the base 28, wherein the cover 30 has an aperture 74 through which the body 32 extends. In an exemplary embodiment, body 32 comprises an internal recess 68, 70 in communication with the slot 34.

In an exemplary embodiment, a method for mounting a panel 22 to a surface 24 comprises attaching a spigot 26a by its base 28 to the surface 24; disposing a portion of the panel 22 in a slot 34 of the spigot 26a, wherein the panel 22 extends substantially perpendicular to the surface 24; and raising an end 72 of a lever 40 of the spigot 26b (such as by pivoting the lever 40) to frictionally engage the panel 22. In an exemplary embodiment, lever 40 comprises cam head 50. In an exemplary embodiment, the cam head 50 comprises a first surface 56 that does not extend into the slot 34 when the lever 40 is in an open position and a second surface 60 that extends into the slot 34 when the lever 40 is in a closed position.

In an exemplary embodiment, the method comprises disposing a liner 38 in the slot 34 before disposing the portion of the panel 22 in the slot 34. In an exemplary embodiment, raising the end 72 of the lever 40 moves a cam head 50 into contact with a metallic plate 48 of the liner 38. In an exemplary embodiment, the method comprises disposing a cover 30 over the base 28 after attaching the spigot 26a by its base 28 to the surface 24. In an exemplary embodiment, the method comprises adjusting a tilt of the spigot 26b relative to the surface 24, such as by differentially advancing set screws in apertures 76 against surface 80 of backer plate 78.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. An apparatus configured for use in a railing system comprising a panel, the apparatus comprising:
    an elongated body comprising:
        an outer surface and first and second opposed ends;
        a slot extending from the first end into the elongated body and configured to accept the panel, wherein the slot separates first and second branches of the body; and
        a channel disposed through the first branch and in communication with the slot;
    a lever disposed in the channel, wherein the lever comprises:
        a cam head pivotally connected to the elongated body; and a lever end opposite the cam head, wherein the lever end is configured to move between an open position and a closed position;
    wherein:
        in the open position, a first surface of the cam head does not extend into the slot; and
        in the closed position, a second surface of the cam head rotates and extends into the slot, wherein the lever is flush with the outer surface;
    a base at the second end of the elongated body comprising a plurality of first apertures and a plurality of second apertures interspersed with the plurality of first apertures; and
    a leveling plate that:
        is configured to be disposed between the base and a floor; and
        comprises a plurality of third apertures configured to vertically align with the plurality of first apertures.

2. The apparatus of claim 1 comprising a liner disposed in the slot.

3. The apparatus of claim 2 wherein the liner comprises a resilient polymeric material.

4. The apparatus of claim 2 wherein the liner comprises a metallic plate positioned to contact the cam head.

5. The apparatus of claim 1 comprising a cover disposed over the base at the second end of the elongated body, wherein the cover comprises a first aperture through which the body extends.

6. The apparatus of claim 1 wherein the body comprises an internal recess in communication with the slot.

7. The apparatus of claim 1, wherein the base extends radially from the second end of the elongated body.

8. The apparatus of claim 1, wherein the cam head is pivotally connected to the elongated body proximate the second end of the elongated body.

9. The apparatus of claim 1, wherein the outer surface is substantially cylindrical.

* * * * *